Figure 1:
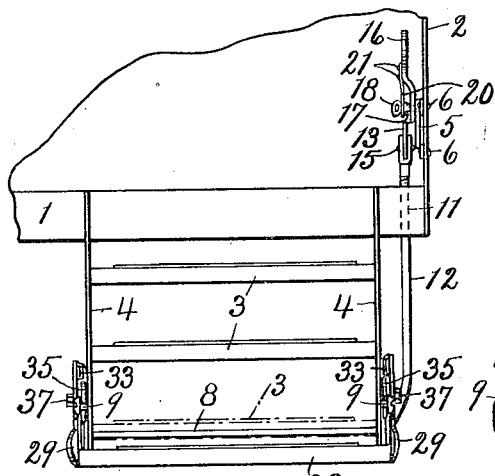

C. E. GAUTHIER.
EXTENSION CAR STEP.
APPLICATION FILED DEC. 26, 1914.

1,130,390.

Patented Mar. 2, 1915.

WITNESSES:
A. C. Fairbanks
H. D. Cutter

INVENTOR.
Clarence E. Gauthier,
BY Webster & Co.,
ATTORNEYS.

UNITED STATES PATENT OFFICE.

CLARENCE E. GAUTHIER, OF WEST SPRINGFIELD, MASSACHUSETTS.

EXTENSION CAR-STEP.

1,130,390.  Specification of Letters Patent.  Patented Mar. 2, 1915.

Application filed December 26, 1914. Serial No. 879,037.

*To all whom it may concern:*

Be it known that I, CLARENCE E. GAUTHIER, a citizen of the United States of America, residing at West Springfield, in the county of Hampden and State of Massachusetts, have invented a new and useful Extension Car-Step, of which the following is a specification.

My invention relates to improvements in swinging extension steps which are particularly adapted for use in connection with and auxiliary to steps of the permanent or fixed type with which railway-cars and like vehicles are equipped, and consists of a step provided at the ends with certain peculiar supports or brackets, certain members of special construction which are designed to be pivotally attached to, supported from, or connected with the fixed steps or the stairway of a vehicle, and from which said brackets are suspended, and novel actuating or operating means for the swinging step, such means acting through the medium and with the aid of the aforesaid members, together with locking and releasing means for said operating means and the connected mechanism and step, all as hereinafter set forth.

The objects of my invention are, first, to provide an auxiliary step, for railway-cars and the like, wherewith to do away with the need for the porter's stool or box as an aid to passengers upon entering and leaving a car or other vehicle, which step can easily and quickly be controlled by means of a single conveniently-located hand lever or operating handle, a movement imparted to such handle in one direction being all that is required to project such step into operative position, and a movement imparted to such handle in the opposite direction being all that is required to retract such step and locate it out of the way immediately under and close to or in actual contact with the bottom fixed step; second, to provide for such auxiliary step strong, durable and rigid, yet comparatively inexpensive and simple mechanism for operating it, that is, for projecting said auxiliary step downwardly and forwardly into operative position below and in front of the aforesaid bottom fixed step, and retracting upwardly and rearwardly said auxiliary step until it comes to position beneath said bottom fixed step, such mechanism being provided with adequate locking and releasing means, and, third, to produce an appliance of this kind that can be attached readily to the vehicle.

Other objects will appear in the course of the following description.

I attain the objects and secure the advantages of my invention by the means illustrated in the accompanying drawings, in which—

Figures 2, 5:
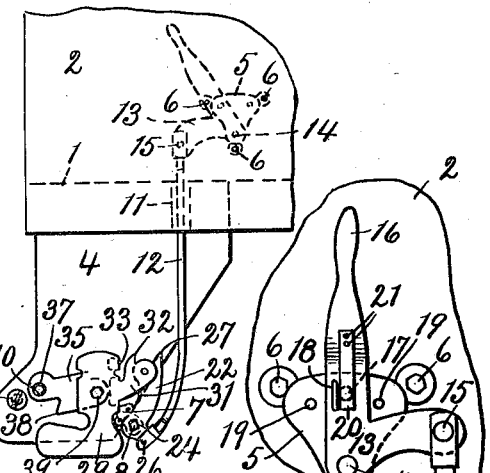
Figures 3, 4:
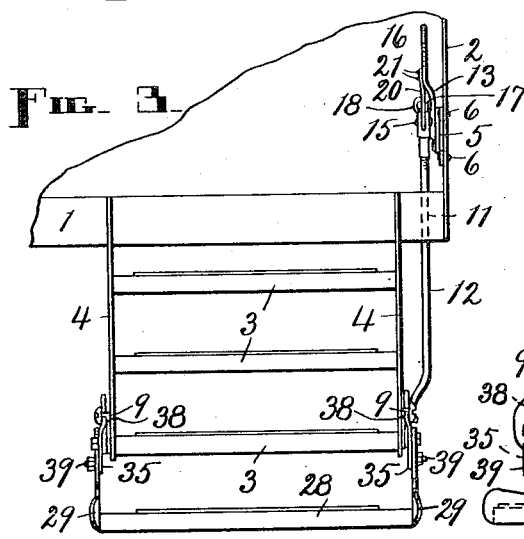
Figures 6, 7:
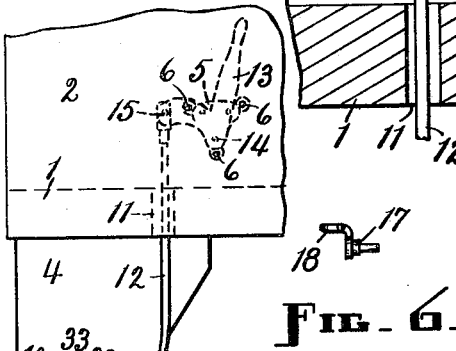
Figure 12:
Figures 9, 10, 11:
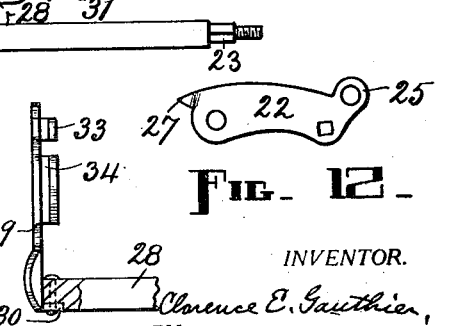

Figure 1 is a front elevation of a practical embodiment of my invention as applied to the fixed steps, platform and vestibule of a car, the auxiliary step and its actuating mechanism being disposed in closed or retracted position; Fig. 2, an end elevation of the aforesaid car members and a side elevation of said mechanism, the latter being closed or retracted as before; Fig. 3, a view similar to Fig. 1, but showing said auxiliary step and mechanism in open or extended position, the former being projected ready for use; Fig. 4, a view similar to Fig. 2, but showing the parts disposed as in Fig. 3; Fig. 5, an enlarged elevation, as viewed from the inside of the vestibule, of the operating lever and associated parts, such lever being disposed in an intermediate position for the sake of clearness; Fig. 6, an enlarged side elevation of the lock pin; Fig. 7, an enlarged side elevation of one of the shaft bearing brackets or hangers; Fig. 8, an enlarged side elevation of the shaft; Fig. 9, an enlarged side elevation of one of the step hangers; Fig. 10, an enlarged inside elevation of one of the step brackets, showing in section the step attached thereto; Fig. 11, a front elevation of the bracket shown in the preceding view, a fragment of the attached step, in partial section, also appearing, and, Fig. 12, an enlarged side elevation of one of the rocker-arms.

With the exception of the lock pin and its spring, the members shown in Fig. 5 are represented by dotted lines in Figs. 2 and 4, as they would appear if they could be seen through the vestibule end.

Similar numerals designate similar parts throughout the several views.

In the first five views portions of a car platform and vestibule are represented at 1 and 2, respectively, and a stairway supported from said platform. Said stairway, comprising in this case three steps or treads 3 and two side pieces 4, is constructed and supported in the usual manner, and is a permanent fixture. A triangular plate 5 is bolted at 6 to the inside of the outer end of the vestibule 2. Rigidly attached to each side piece 4, at the back and a short distance above the bottom thereof, is a hanger or bearing bracket 7. The brackets 7 project far enough beyond the side pieces 2 to support a rock-shaft 8, which is journaled in said brackets, clear of said side pieces. The rock-shaft 8 is positioned by the brackets 7 behind the bottom tread 3, as clearly shown in Fig. 1, wherein said tread is represented only by dot-and-dash lines so as to disclose said rock-shaft. Projecting outwardly from each side piece 4, near the front edge and a short distance above the bottom edge thereof, is a stop pin 9, and behind and slightly above the vertical and horizontal planes, respectively, of such pin is a pivot pin 10, the latter like the former projecting from the side piece. The plate 5 and the pairs of hangers 7, pins 9, and pins 10 are the only members of the new device or appliance that have to be attached or affixed to the car, and they can be installed very readily and without making any change whatever in the old parts or their construction or cutting into the same. The only cutting of any of the aforesaid old parts that is required, in order to apply my appliance thereto, is that of a vertical passage 11 through the platform 1, between the vertical planes of the outer end of the vestibule 2 and the adjacent side piece 4, for the accommodation of a connecting rod 12.

A bell-crank-lever 13 is pivoted at 14 to the plate 5 near the bottom thereof, and the upper forked terminal of the connecting rod 12 is pivotally attached at 15 to the forwardly-projecting arm of said lever. The other arm of the bell-crank-lever 13 terminates at the top in a handle 16.

Mounted to slide in the upwardly directed arm of the bell-crank-lever 13 is a lock pin 17, which has on one end an ear 18 that serves as a convenient handle for withdrawing said pin from locking position. The end of the pin 17 that is opposite to the ear or handle 18 is adapted to contact with the plate 5, which is between the outer vestibule end and the bell-crank-lever, and to enter either of two openings 19 in said plate. A spring 20 is attached at 21 to the bell-crank-lever and arranged to bear on the head of the pin 17 and normally to retain said pin in contact with said plate or in either one of the openings 19, said spring forcing said pin into one or the other of said openings accordingly as said lever is thrown forward or backward the required distance. Necessarily the openings 19 are located in the arc of a circle described by the pin 17 when moved by the bell-crank-lever in rocking on the pivot 14. Thus means is provided for locking the bell-crank-lever at either end of its travel, and for releasing it as well.

A rocker-arm 22 is rigidly attached to the rock-shaft 8 at each end, being mounted on a squared part 23 of said shaft. The rock-shaft is long enough to locate the rocker-arms 22 beyond the side pieces 4. A nut 24 may be employed on the rock-shaft outside of each rocker-arm to hold said shaft against endwise movement. Each rocker-arm is between one of the hangers 7 and the contiguous nut 24. The right-hand rocker-arm has a rearwardly-extending projection 25 to which the lower forked terminal of the connecting rod 12 is pivoted at 26. At what may be styled the free end of each rocker-arm is a stop lug 27.

When the bell-crank-lever 13 is thrown backward the connecting rod 12 is drawn up, and the construction and arrangement of parts are such that the rocker-arm 22 which is pivotally attached to said rod is then actuated from an approximately vertical to an approximately horizontal position, rocking on the rock-shaft 8 and carrying with it said shaft and the left-hand rocker-arm 22. On the other hand, when the bell-crank-lever is thrown forward the rod 12 is depressed, and the rocker-arms 22 are actuated upward into their former positions, through the medium of the projection 25, and the rock-shaft. The remaining elements in the appliance, on both sides, are operated either directly or indirectly by the rock-shaft and rocker-arms, as will presently appear.

The auxiliary step may be said to comprise a step proper or tread 28 and a pair of brackets 29. The brackets 29 have inner bottom ledges 30 upon which the ends of the tread 28 are received and to which such ends are fastened. Extending from the back edge of each bracket 29 is an arm 31, which has at its free terminal a stop lug 32. The arm 31 in each case is pivoted at 34 to the free terminal of the contiguous rocker-arm 22, and when said rocker-arm is actuated forward and downward its lug 27 interlocks with the lug 32 on said arm, as will be clearly understood upon referring to Fig. 4, and the interlocking lugs check further downward movement of the parts. A lip 33 is formed on the inside of each bracket 29 at the back edge near the top, and below such lip is another lip 34.

Two hangers or links 35 are provided to connect the brackets 29 with the pivot pins 10. Each link 35 has a slot or an elongated opening 36 therein near the top or outer end, and one of the pins 10 is received in such opening, a nut 37 being employed to prevent the link from becoming disconnected from the pin. When the auxiliary step is retracted to closed or inoperative position, the links 35 are disposed in an approximately horizontal position, with the outer ends of the openings 36 in contact with the pins 10, and, when said step is projected into open or operative position, said links are disposed in an approximately vertical position, with said ends of said openings again in contact with said pins. In changing position a limited amount of lost motion is required for the links 35, and this is afforded by the elongated openings 36. Each link 35 has its under or forward edge, according to the position of the link, shouldered at 38 to engage the stop pin 9, when said link is actuated downward and forward, and limit the movement in such directions, the shoulder then coming up beneath the pin, as clearly shown in Fig. 4. The end of each link 35, which is opposite to that in which the opening 36 is located, is pivoted at 39 to the inside of the associated bracket 29 in front of the lip 34 on such bracket. Each link 35 has a stop lug 40 arranged thereon to hook over the top of the back part of the adjacent ear 34, when the mechanism is disposed to project the auxiliary step. It will now be seen that, when the auxiliary step is in advanced position, and the shoulders 38 are under the pins 9, the lips 33 embrace and engage the then rear edge of the links 35, and the lugs 40 engage the lips 34 at the top, so that further forward movement of the brackets 29 is absolutely prevented. Thus the auxiliary step is held securely in operative position, forward displacement being prevented by the pins 9 and shoulders 38, the links 35 and lips 33, and the lugs 40 which interlock with the lips 34, and backward displacement being prevented by the arms 31 and the rocker-arms 22 with their interlocking lugs 32 and 27, and the pin 17, which is now in the rear opening 19, and intervening parts and members.

Starting with the mechanism disposed as in the first two views, the complete operation of such mechanism is briefly described as follows: The pin 17 is withdrawn, against the resiliency of the spring 20, from the forward opening 19 in the plate 5, and the bell-crank-lever 13, by means of the handle 16, is rocked backward on the pivot 14 until said pin, which the operator releases, snaps into the back opening 19. This action causes the rod 12 to be drawn upward and the attached rocker-arm 22 and through the medium of the rock-shaft 8, the other rocker-arm 22 to be rocked downward, with the result that the brackets 29 and the links 35 are forced downward and forward until the tread 28 is located in proper position relative to the bottom tread 3. When the pin 17 is released it rides on the face of the plate 5 until the rear opening 19 is reached, when the spring 20 urges said pin into said opening. The auxiliary step is now locked securely in operative position, as shown in Figs. 3 and 4, and so remains until it is no longer needed. The auxiliary step is retracted by releasing or unlocking the bell-crank-lever 13, rocking it forward, and relocking it, the unlocking and relocking operations being performed in practically the same manner as before. When rocked forward the bell-crank-lever depresses the rod 12, the latter raises or causes to be raised the rocker-arms 22, and said arms in turn draw back and carry up the brackets 29 and the links 35, until the tread 28 is again located beneath the bottom tread 3, the parts now being disposed once more in initial position, as they appear in Figs. 1 and 2. The mechanism is held securely in initial position by the pin 17 in the front opening 19.

The term "stairway" as employed herein is intended to mean a step or steps with the necessary elements to support the same from a platform.

Various changes in the shape, size, construction and arrangement of some or all of the parts herein shown and described may be made without departing from the spirit of my invention.

What I claim as my invention, and desire to secure by Letters Patent, is—

1. The combination, in an appliance of the class described, with a platform provided with a stairway, of a tread having rising from the ends thereof and rigidly attached thereto brackets provided with rearwardly extending arms, links pivotally supported from the sides of said stairway and pivotally connected with said brackets, a rock-shaft journaled at the back of said stairway, rocker-arms mounted on said shaft and pivotally connected with said bracket arms, and means to operate said rocker-arms to project said tread into operative position and retract it therefrom.

2. The combination, in an appliance of the class described, with a platform provided with a stairway, of a tread having rising from the ends thereof and rigidly attached thereto brackets provided with rearwardly-extending arms, links pivotally supported from the sides of said stairway and pivotally connected with said brackets, a rock-shaft journaled at the back of said stairway, rocker-arms mounted on said shaft and pivotally connected with said bracket arms, and means applied to one of said rocker-arms to operate both rocker-arms to project said tread into operative position and retract it therefrom.

3. The combination, in an appliance of the class described, with a platform provided with a stairway and with a fixed vertical member above, of a tread having end brackets provided with arms, links pivotally supported from said stairway and pivotally connected with said brackets, a rock-shaft journaled at the back of said stairway, rocker-arms mounted on said shaft and pivotally connected with said bracket arms, operating means attached to said fixed vertical member, such means consisting in part of a rod which is pivotally connected with one of said rocker-arms, and means to lock said operating means in either of two positions.

4. The combination, in an appliance of the class described, with a platform provided with a stairway, of a rock-shaft journaled at the back of said stairway, a pair of rocker-arms mounted on said shaft, a pair of links pivotally supported from the sides of said stairway, a pair of brackets and a tread supported by said brackets, such brackets being suspended from said rocker-arms and links and having said tread rigidly attached thereto and operating means for said rocker-arms.

5. The combination, in an appliance of the class described, with a platform provided with a stairway and with a fixed vertical member above, of a rock-shaft journaled at the back of said stairway, a pair of rocker-arms mounted on said shaft, a pair of links pivotally supported from said stairway, a pair of brackets and a tread supported between said brackets, such brackets being suspended from said rocker-arms and links, a bell-crank-lever supported by said fixed vertical member, a rod connecting said bell-crank-lever with one of said rocker-arms, and means to lock said bell-crank-lever at either end of its travel.

6. The combination, in an apparatus of the class described, with a platform provided with a stairway and with a fixed vertical member above, of a rock-shaft journaled at the back of said stairway, a pair of rocker-arms mounted on said shaft, a pair of links pivotally supported from said stairway, a pair of brackets and a tread supported between said brackets, such brackets being suspended from said rocker-arms and links, a plate attached to said fixed vertical member, such plate having pin-engaging parts, a bell-crank-lever pivotally connected with said plate, and a pin carried by said bell-crank-lever for the purpose of locking said lever, at either end of its travel, through the medium of said pin-engaging parts.

7. The combination, in an appliance of the class described, with a platform provided with a stairway, of a rock-shaft journaled at the back of said stairway, a pair of rocker-arms mounted on said shaft, a pair of links pivotally supported from said stairway, a pair of brackets and a tread supported between said brackets, the latter being suspended from said rocker-arms and links, and operating means for said rocker-arms, said rocker-arms and brackets being provided with lugs arranged to interlock when said rocker-arms and brackets are actuated downwardly and forwardly, to limit such movement.

8. The combination, in an appliance of the class described, with a platform provided with a stairway, of a rock-shaft journaled at the back of said stairway, a pair of rocker-arms mounted on said shaft, a pair of links pivotally supported from said stairway, a pair of brackets and a tread supported between said brackets, the latter being suspended from said rocker-arms and links, operating means for said rocker-arms, and stop members projecting from said stairway into the paths of said links, when the latter are in their forward position, to limit the forward movement of the links.

9. The combination, in an appliance of the class described, with a platform provided with a stairway, of a rock-shaft journaled at the back of said stairway, a pair of rocker-arms mounted on said shaft, a pair of links pivotally supported from said stairway, a pair of brackets and a tread supported between said brackets, the latter being suspended from said rocker-arms and links, and provided with lips to engage said links, when the parts are in advanced position, to limit the forward movement of said brackets, operating means for said rocker-arms, and locking and releasing means for said operating means.

10. The combination, in an appliance of the class described, with a platform provided with a stairway, of a rock-shaft journaled at the back of said stairway, a pair of rocker-arms mounted on said shaft, a pair of links pivotally supported from said stairway, such links being provided with lugs, a pair of brackets and a tread supported between such brackets, the latter being suspended from said rocker-arms and links, and having projecting members with which said lugs engage, when the parts are in advanced position, to limit the forward movement of said brackets, operating means for said rocker-arms, and locking and releasing means for said operating means.

11. The combination, in an appliance of the class described, with a platform provided with a stairway, of a rock-shaft journaled at the back of said stairway, a pair of rocker-arms mounted on said shaft, a pair of links pivotally supported from said stairway, such links being provided with lugs, a pair of brackets and a tread supported between said brackets, the latter being suspended from said rocker-arms and links, and provided with lips to engage said links, and with projecting members with which said lugs engage, when the parts are in advanced position, to limit the forward movement of said brackets, operating means for said rocker-arms, and locking and releasing means for said operating means.

12. The combination, in an appliance of the class described, with a platform provided with a stairway, of a rock-shaft journaled at the back of said stairway, a pair of rocker-arms mounted on said shaft, a pair of links pivotally supported from said stairway, such links having lugs, stop members projecting from said stairway into the paths of said links to limit the forward movement of the latter, a pair of brackets and a tread supported between said brackets, the latter being suspended from said rocker-arms and links, and having lips to engage said links and projecting members with which said lugs engage, when the parts are in advanced position, to limit the forward movement of said brackets, operating means for said rocker-arms, and locking and releasing means for said operating means.

13. The combination, in an appliance of the class described, with a platform provided with a stairway, of a rock-shaft journaled at the back of said stairway, rocker-arms mounted on said shaft, a pair of links pivotally supported from said stairway, a pair of brackets and a tread supported between such brackets, the latter being suspended from said rocker-arms and links, and operating means for said rocker-arms, said rocker-arms and said brackets having members which are adapted to engage each other to limit the downward and forward movement of the parts, and said links and brackets also having members which are adapted to engage each other to limit such movement of the parts.

14. The combination, in an appliance of the class described, with a platform provided with a stairway, of a rock-shaft journaled at the back of said stairway, rocker-arms mounted on said shaft, a pair of links pivotally supported from said stairway, a pair of brackets and a tread supported between such brackets, the latter being suspended from said rocker-arms and links, operating means for said rocker-arms, said rocker-arms and said brackets having members which are adapted to engage each other to limit the downward and forward movement of the parts, and said links and brackets also having members which are adapted to engage each other to limit such movement of the parts, and stop members projecting from said stairway into the paths of said links to limit their forward movement.

15. The combination, in an appliance of the class described, with a platform provided with a stairway, of a rock-shaft journaled at the back of said platform, rocker-arms mounted on said shaft, operating means for said rocker-arms, locking and releasing means for said operating means, links pivotally supported from the sides of said stairway, brackets and a tread rigidly attached to and supported between them, such brackets being suspended from said rocker-arms and links, and means to check the forward movement of said brackets.

CLARENCE E. GAUTHIER.

Witnesses:
A. C. FAIRBANKS,
JOSEPH C. GAUTHIER.

Copies of this patent may be obtained for five cents each, by addressing the "Commissioner of Patents, Washington, D. C."